US012533774B2

(12) United States Patent
Lee

(10) Patent No.: US 12,533,774 B2
(45) Date of Patent: Jan. 27, 2026

(54) ENGAGING STRUCTURE FOR HAND TOOL

(71) Applicant: Tsan-Chang Lee, Taichung (TW)

(72) Inventor: Tsan-Chang Lee, Taichung (TW)

( * ) Notice: Subject to any disclaimer, the term of this patent is extended or adjusted under 35 U.S.C. 154(b) by 366 days.

(21) Appl. No.: 18/364,331

(22) Filed: Aug. 2, 2023

(65) Prior Publication Data

US 2025/0042000 A1 Feb. 6, 2025

(51) Int. Cl.

| | |
|---|---|
| ***B25B 13/06*** | (2006.01) |
| ***B25B 13/04*** | (2006.01) |
| ***B25B 13/08*** | (2006.01) |
| ***B25B 13/46*** | (2006.01) |
| ***B25B 23/00*** | (2006.01) |

(52) U.S. Cl.

CPC ........ *B25B 13/065* (2013.01); *B25B 23/0014* (2013.01); *B25B 13/04* (2013.01); *B25B 13/08* (2013.01); *B25B 13/462* (2013.01)

(58) Field of Classification Search

CPC ....... B25B 13/04; B25B 13/06; B25B 13/065; B25B 13/08; B25B 13/462; B25B 13/5033; B25B 23/0014

See application file for complete search history.

(56) References Cited

U.S. PATENT DOCUMENTS 4,100,824 A * 7/1978 Marschke ............. B25B 13/065 81/124.6
5,388,486 A * 2/1995 Ruzicka .................. B25B 13/04 81/124.3
5,832,792 A * 11/1998 Hsieh .................... B25B 13/065 81/124.6
5,860,339 A * 1/1999 Mikic ..................... B25B 13/08 81/186
5,996,449 A * 12/1999 Hsieh ...................... B25B 13/08 81/186
6,098,501 A * 8/2000 Sundstrom ............ B25B 13/065 81/186
7,311,022 B2 * 12/2007 Putney .................. B25B 13/065 81/125
8,056,449 B2 * 11/2011 Hsieh .................... B25B 13/065 81/121.1
9,120,210 B2 * 9/2015 Lee ......................... B25B 13/08
9,718,170 B2 * 8/2017 Eggert .................. B25B 13/065
10,596,685 B2 * 3/2020 Lee ..................... B25B 23/0014
10,786,890 B2 * 9/2020 Kukucka ................. B25B 13/08
11,219,985 B2 * 1/2022 Milligan ................. B25B 13/08
2007/0295170 A1 * 12/2007 Hsieh ...................... B25B 13/08 81/119

(Continued)

*Primary Examiner* — David B. Thomas
(74) *Attorney, Agent, or Firm* — LANWAY IPR SERVICES; Chun-Ming Shih

(57) ABSTRACT

An engaging structure for a hand tool includes a main body. The main body has a mounting element. The mounting element includes multiple first recessed portions, multiple second recessed portions, and multiple locking sides. Each of the first recessed portions is provided with two grooves. Each of the second recessed portions is provided with a first curved face. Each of the locking sides has a planar shape. Each of the locking sides is arranged between two of the second recessed portions. Each of the first recessed portions is formed on one of the locking sides. The locking sides construct a first hexagon. The first hexagon has a center provided with a central axis. The first hexagon has six side faces. Each of the six side faces coincide with each of the locking sides.

7 Claims, 16 Drawing Sheets

(56) References Cited

U.S. PATENT DOCUMENTS

| | | | | |
|---|---|---|---|---|
| 2017/0291284 | A1* | 10/2017 | Eggert | B25B 13/065 |
| 2019/0176310 | A1* | 6/2019 | McKenzie | B25B 23/105 |
| 2019/0217449 | A1* | 7/2019 | Lee | B25B 13/065 |
| 2022/0226969 | A1* | 7/2022 | Lee | B25B 13/04 |
| 2024/0217070 | A1* | 7/2024 | Chen | B25B 13/065 |

* cited by examiner

ENGAGING STRUCTURE FOR HAND TOOL

BACKGROUND OF THE INVENTION

Field of the Invention

The present invention relates to a hand tool and, more particularly, to an engaging structure for a hand tool.

Description of the Related Art

A conventional socket structure was disclosed in the applicant's U.S. Pat. No. 10,596,685, and comprises a mounting portion 11 and multiple curved recesses 14. The mounting portion 11 is used for mounting an object 30. The object 30 has multiple corners 31 situated in the curved recesses 14. Thus, when the object 30 is rotated by the mounting portion 11, the curved recesses 14 will not wear the corners 31. However, the mounting portion 11 is only used for mounting the object 30 with a metric specification and is not available for a workpiece with a British specification, thereby limiting the versatility of the conventional socket structure.

BRIEF SUMMARY OF THE INVENTION

In accordance with the present invention, there is provided an engaging structure for a hand tool, comprising a main body. The main body has a mounting element. The mounting element includes multiple first recessed portions, multiple second recessed portions, and multiple locking sides. Each of the first recessed portions is provided with two grooves. Each of the second recessed portions is provided with a first curved face. Each of the locking sides has a planar shape. Each of the locking sides is arranged between two of the second recessed portions. Each of the first recessed portions is formed on one of the locking sides. The locking sides construct a first hexagon. The first hexagon has a center provided with a central axis. The first hexagon has six side faces. Each of the six side faces coincide with each of the locking sides.

According to the primary advantages of the present invention, the mounting element is provided with the second recessed portions, so that the mounting element is used for mounting and receiving the first screw member, the second screw member, and the third screw member with three different specifications, thereby enhancing the versatility of the main body.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
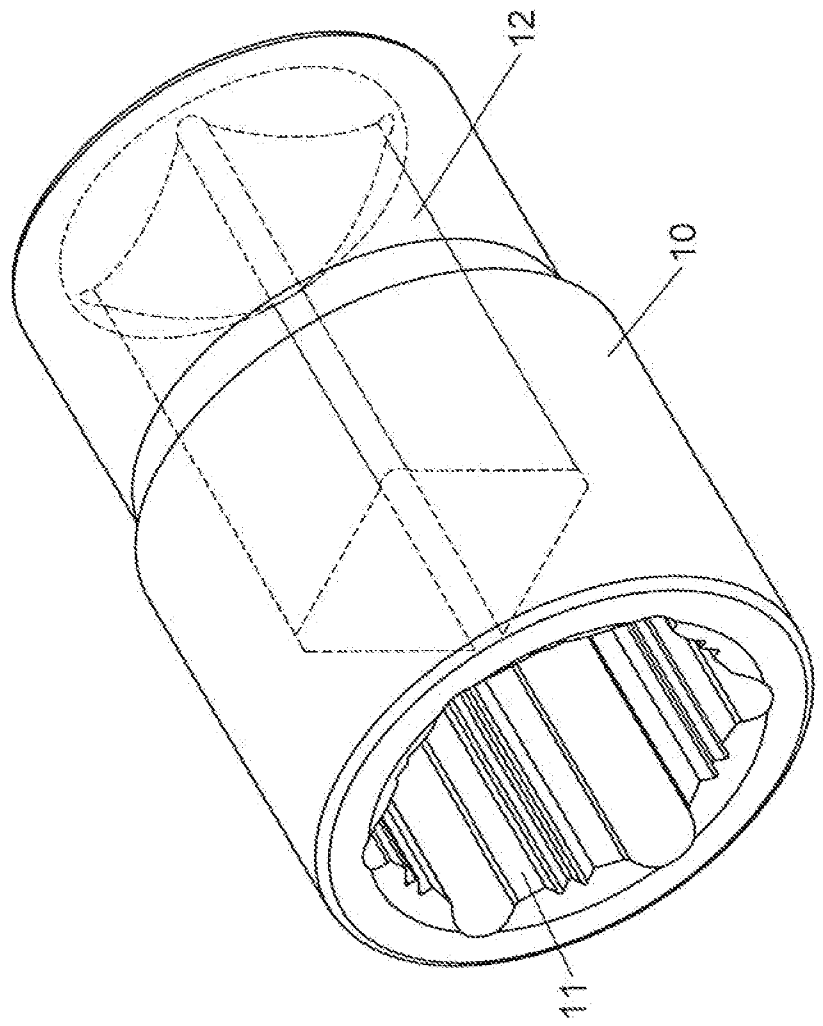
FIG. 1 is a perspective view of an engaging structure for a hand tool in accordance with the first preferred embodiment of the present invention.
Figure 2:
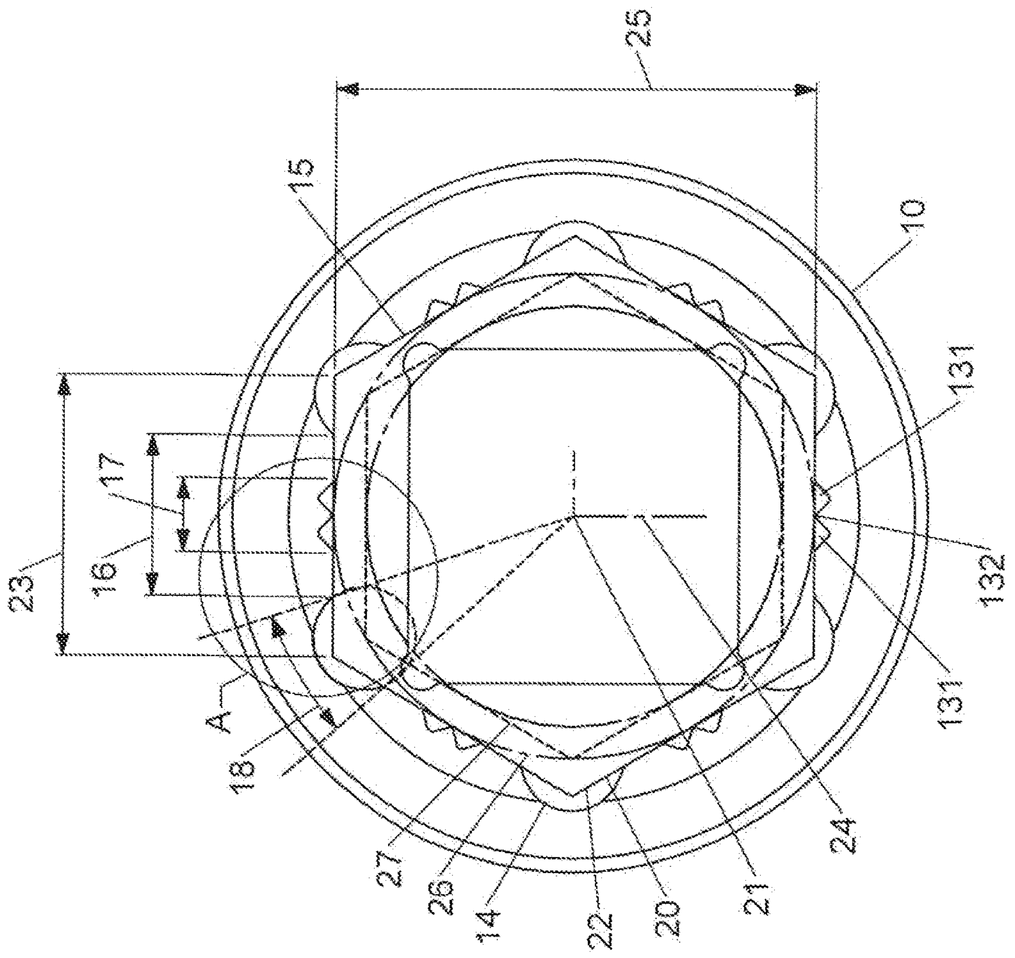
FIG. 2 is a front view of the engaging structure for a hand tool in accordance with the first preferred embodiment of the present invention.
Figure 3:
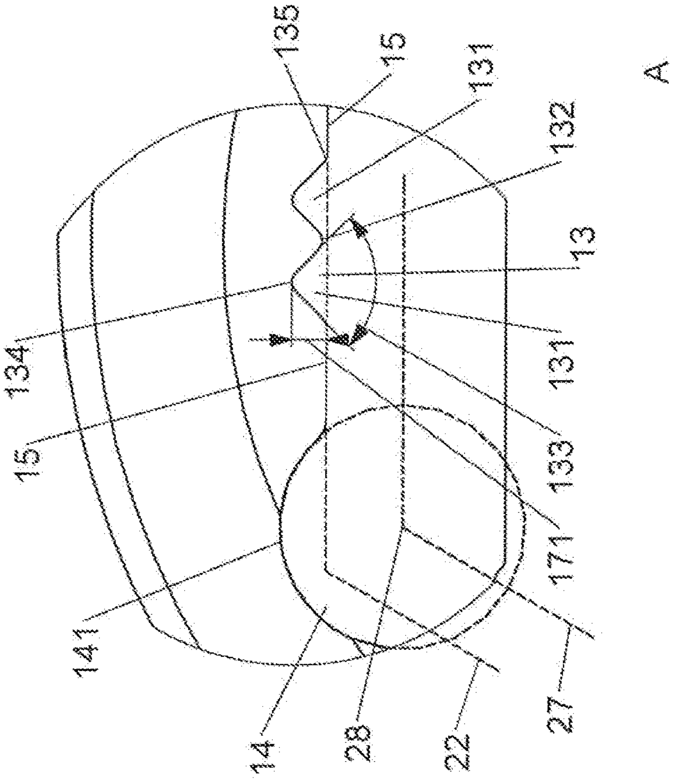
FIG. 3 is a locally enlarged view of the engaging structure for a hand tool taken along circle A as shown in FIG. 2.

Referring to the drawings and initially to FIGS. 1-3, an engaging structure (or an operating structure or a driving structure) for a hand tool in accordance with the preferred embodiment of the present invention comprises a main body 10. The main body 10 has a cylindrical shape. The main body 10 is a socket. The main body 10 has a first end provided with a mounting element 11. The mounting element 11 is a hexagonal recess. The main body 10 has a second end provided with a driven element 12. The driven element 12 is a tetragonal (or quadrilateral) recess. The driven element 12 is mounted on another hand tool.

The mounting element 11 includes multiple first recessed portions 13, multiple second recessed portions 14, and multiple locking sides 15. The first recessed portions 13, the second recessed portions 14, and the locking sides 15 are arranged alternately and annularly. Preferably, the mounting element 11 includes six first recessed portions 13, six second recessed portions 14, and six locking sides 15.

Each of the first recessed portions 13 is provided with two grooves 131. Each of the two grooves 131 has a triangular shape or an equilateral triangular shape. The two grooves 131 are arranged in a linear shape and are connected without a distance therebetween. A first guide corner 132 is defined between the two grooves 131. The first guide corner 132 has a round (or chamfer or fillet or curved or arcuate) shape. A first angle 133 is defined between two sides of each of the two grooves 131. The first angle 133 is equal or close to sixty degrees (60°) or equal or close to ninety degrees (90°). Each of the two grooves 131 has a bottom provided with a second guide corner 134. Thus, each of the first recessed portions 13 has two second guide corners 134, and the first guide corner 132 is arranged between the two second guide corners 134. The second guide corner 134 has a round (or chamfer or fillet or curved or arcuate) shape. The second guide corner 134 has a dimension (or size) equal or close to that of the first guide corner 132. Each of the first recessed portions 13 has two ends each provided with a third guide corner 135. The third guide corner 135 has a round (or chamfer or fillet or curved or arcuate) shape. The third guide corner 135 has a dimension (or size) equal or close to that of the first guide corner 132. At least one of the first recessed portions 13 is arranged between two of the second recessed portions 14.

Each of the second recessed portions 14 is provided with a first curved face 141. The first curved face 141 has an arcuate shape. The first curved face 141 has a single radius.

Each of the locking sides 15 has a planar shape. Each of the locking sides 15 is arranged between two of the second recessed portions 14. Each of the first recessed portions 13 is formed on one of the locking sides 15. Each of the locking sides 15 includes one of the first recessed portions 13. Two of the second recessed portions 14 are arranged on two ends of each of the locking sides 15. Each of the locking sides 15 is arranged between the first curved face 141 of one of the second recessed portions 14 and the first curved face 141 of another one of the second recessed portions 14. Each of the locking sides 15 is not tangent to the first curved face 141 of each of the second recessed portions 14. A round guide corner is defined between each of the locking sides 15 and the first curved face 141 of each of the second recessed portions 14 to smoothly connect each of the locking sides 15 with the first curved face 141 of each of the second recessed portions 14.

Each of the locking sides 15 has a length defining a first length 16. A second length 17 is defined by each of the first recessed portions 13 together with two third guide corners 135 at the two ends thereof. The second length 17 is less than or close to one half of the first length 16. A height 171 is defined by a maximum height between each of the two grooves 131 and one of the locking sides 15. Thus, the height 171 is defined between the second guide corner 134 of each of the two grooves 131 and one of the locking sides 15. The first curved face 141 has two ends forming an expanding angle relative to an axis of the main body 10 and defining a second angle 18. The second angle 18 is less than or close to thirty degrees (30°) or less than or close to twenty five degrees (25°).

The locking sides 15 construct a first hexagon 20. The first hexagon 20 has a center provided with a central axis 21. The first hexagon 20 has six side faces 22. Each of the six side faces 22 coincide with each of the locking sides 15. Each of the six side faces 22 has a length defining a third length 23. The first length 16 is 0.5 times to 0.6 times of the third length 23. The central axis 21 is provided with a vertical line 24. The vertical line 24 passes through a center of circle of the first guide corner 132. A fourth length 25 is defined between two of the six side faces 22. The height 171 is 0.03 times to 0.04 times of the fourth length 25. Alternatively, the height 171 is 0.03 times to 0.35 times of the fourth length 25.

The first hexagon 20 has an inscribed circle 26. The central axis 21 is served as an axis of the inscribed circle 26. The inscribed circle 26 is tangent to each of the six side faces 22. The inscribed circle 26 has a diameter equal to the fourth length 25.

The central axis 21 is served as an axis of a second hexagon 27. The second hexagon 27 is smaller than the first hexagon 20. The second hexagon 27 has six side lines parallel with the six side faces 22 respectively. The second hexagon 27 has six angled corners 28. Each of the six angled corners 28 is served as a center of circle of the first curved face 141 of one of the second recessed portions 14. Each of the six angled corners 28 is close to or coincides with the inscribed circle 26. Thus, the first recessed portions 13, the second recessed portions 14, and the locking sides 15 of the mounting element 11 construct a structure that is similar to a star-shaped structure disclosed in the U.S. Pat. No. 3,584,667. In addition, the second recessed portions 14 are similar to the lobes 18 shown in FIG. 3 of the U.S. Pat. No. 3,584,667.

Figure 4:
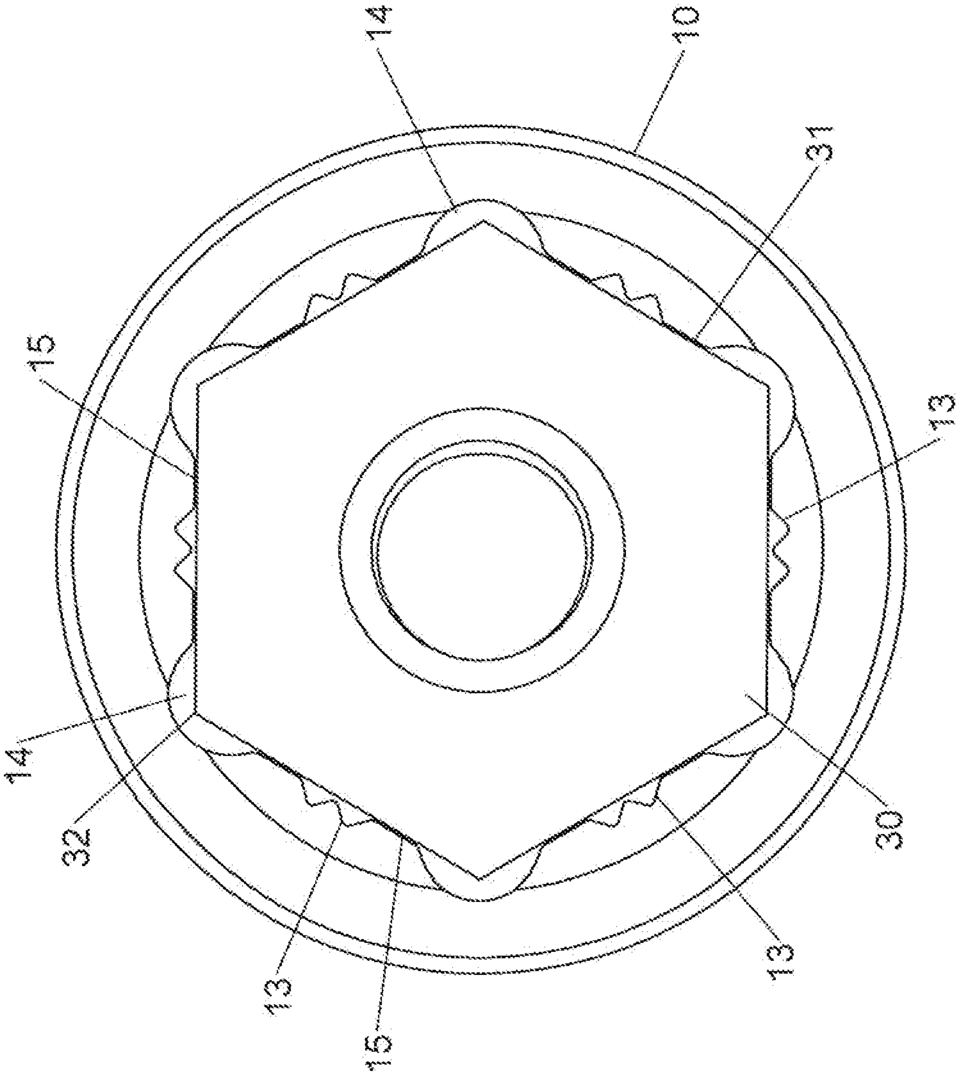
FIG. 4 is a front view showing the engaging structure is used to operate a first screw member.

Referring to FIG. 4 with reference to FIGS. 1-3, the main body 10 is used to operate a first screw member 30. The first screw member 30 is received in the mounting element 11. The first screw member 30 has six first side faces 31 locked respectively by the locking sides 15 of the mounting element 11 and has six first angled corners 32 disposed respectively in the second recessed portions 14 of the mounting element 11. When the mounting element 11 of the main body 10 is rotated to drive the first screw member 30, the second recessed portions 14 of the mounting element 11 will not touch or rub the six first angled corners 32 of the first screw member 30, to prevent the six first angled corners 32 of the first screw member 30 from being worn out. The first screw member 30 has a metric specification.

Figure 5:
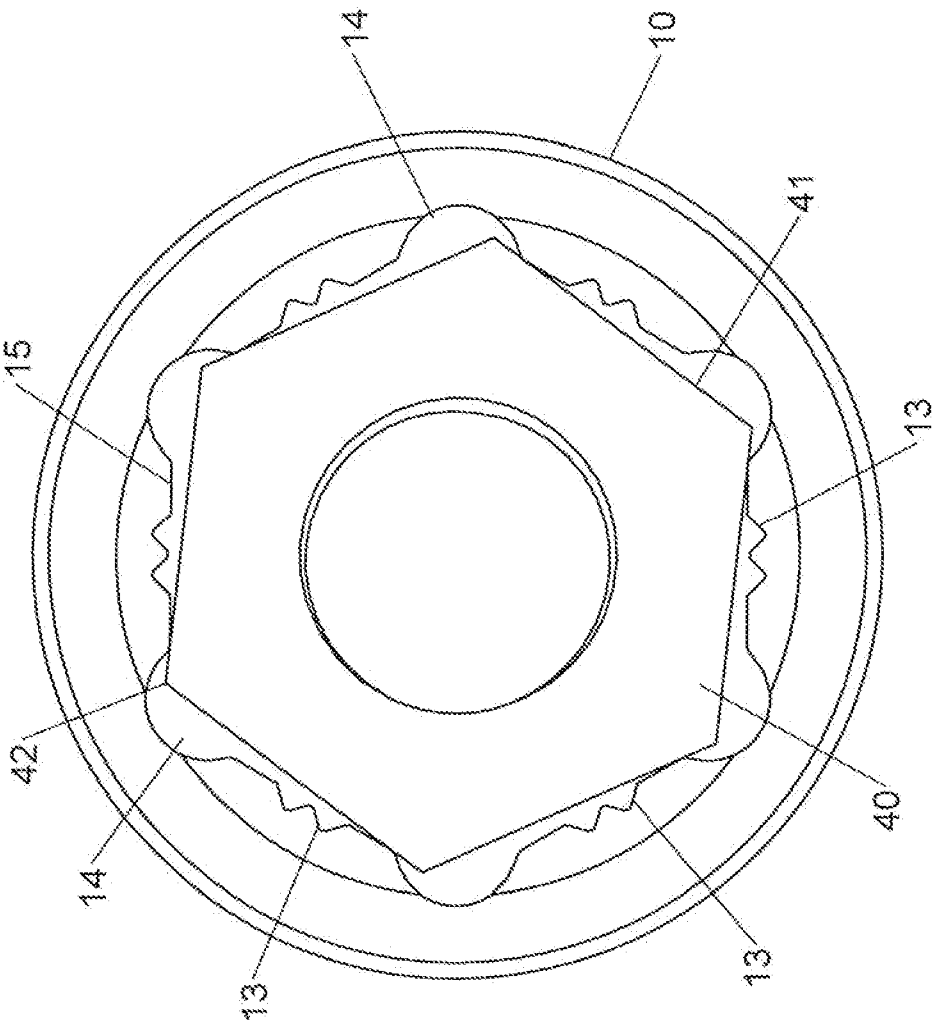
FIG. 5 is a front view showing the engaging structure is used to operate a second screw member.

Referring to FIG. 5 with reference to FIGS. 1-3, the main body 10 is used to operate a second screw member 40. The second screw member 40 is received in the mounting element 11. The second screw member 40 has six second side faces 41 respectively resting on the locking sides 15 of the mounting element 11 and has six second angled corners 42 disposed respectively in the second recessed portions 14 of the mounting element 11. When the mounting element 11 of the main body 10 is rotated to drive the second screw member 40, the second recessed portions 14 of the mounting element 11 will not touch or rub the six second angled corners 42 of the second screw member 40, to prevent the six second angled corners 42 of the second screw member 40 from being worn out. The second screw member 40 has a British specification.

Figure 6:
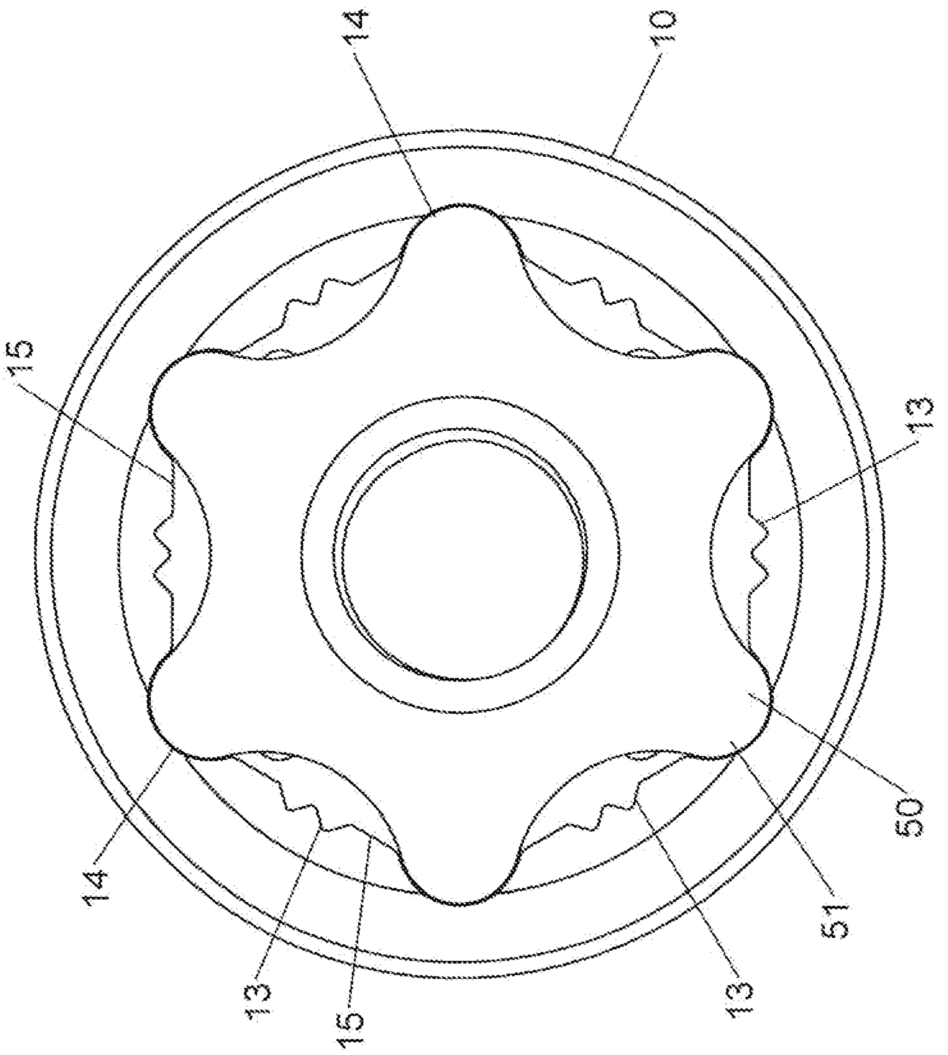
FIG. 6 is a front view showing the engaging structure is used to operate a third screw member.

Referring to FIG. 6 with reference to FIGS. 1-3, the main body 10 is used to operate a third screw member 50. The third screw member 50 has a star-shaped structure with an E-type specification. The third screw member 50 is provided with six protruding ribs 51. The six protruding ribs 51 of the third screw member 50 are arranged annularly. The six protruding ribs 51 of the third screw member 50 are received in the second recessed portions 14 of the mounting element 11 respectively. Each of the six protruding ribs 51 of the third screw member 50 rests on the first curved face 141 of one of the second recessed portions 14.

Figure 7:
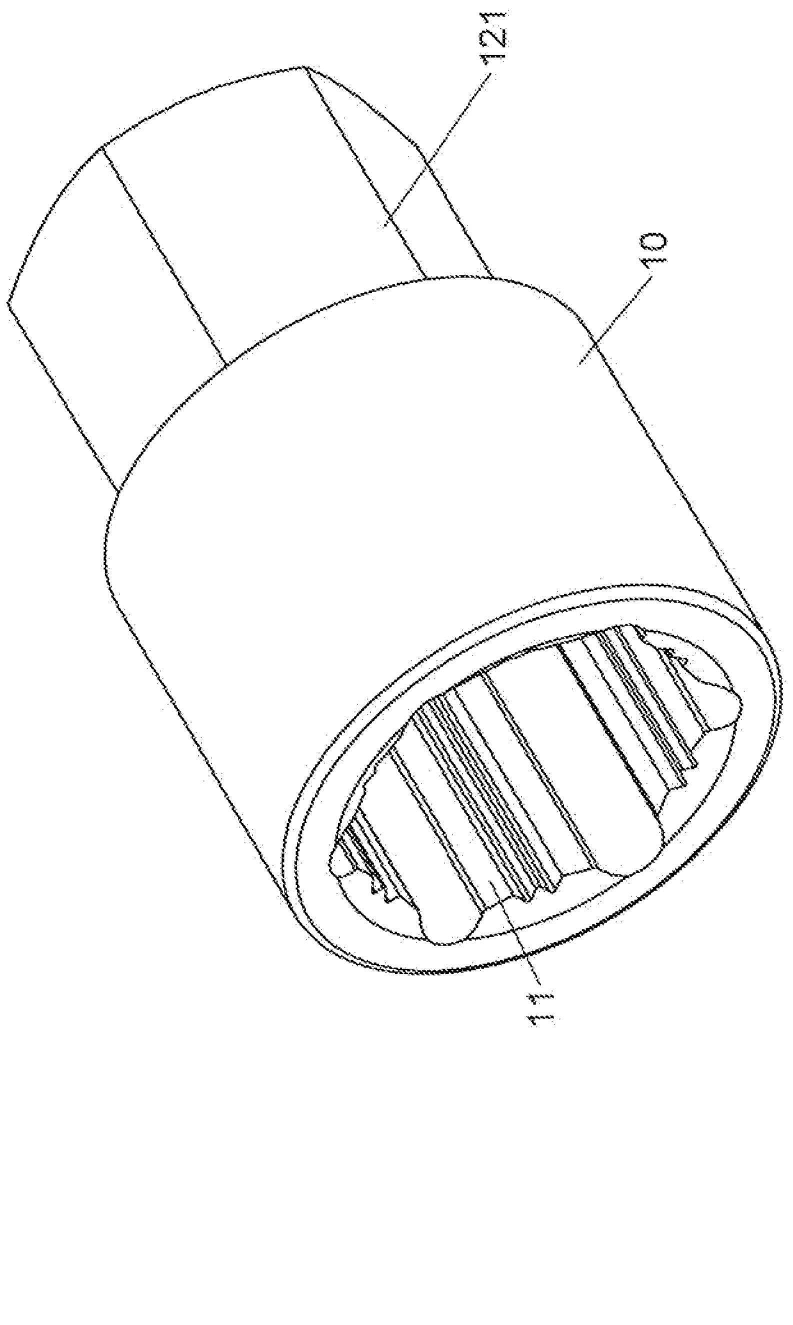
FIG. 7 is a perspective view of an engaging structure for a hand tool in accordance with the second preferred embodiment of the present invention.

Referring to FIG. 7, the main body 10 is a penetrating socket structure 121.

Figure 8:
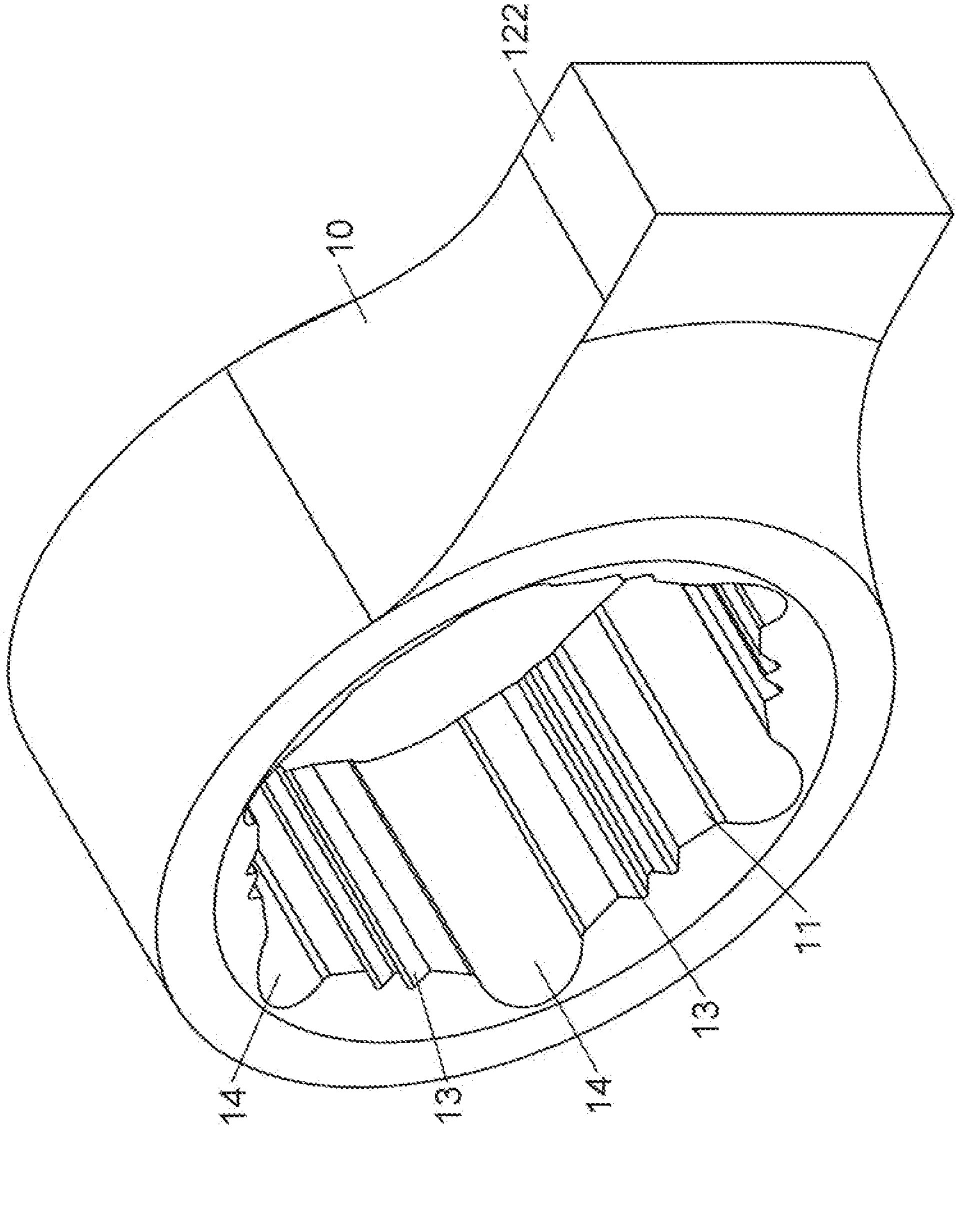
FIG. 8 is a perspective view of an engaging structure for a hand tool in accordance with the third preferred embodiment of the present invention.

Referring to FIG. 8, the main body 10 is a box end wrench structure 122.

Figure 9:
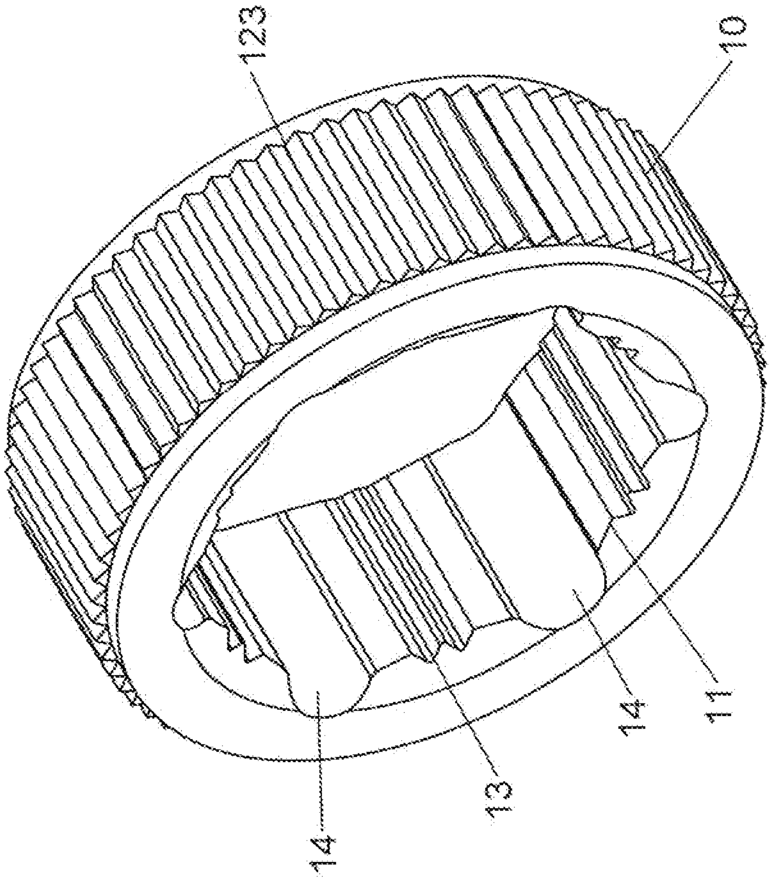
FIG. 9 is a perspective view of an engaging structure for a hand tool in accordance with the fourth preferred embodiment of the present invention.

Referring to FIG. 9, the main body 10 is a ratchet wheel structure 123.

Figure 10:
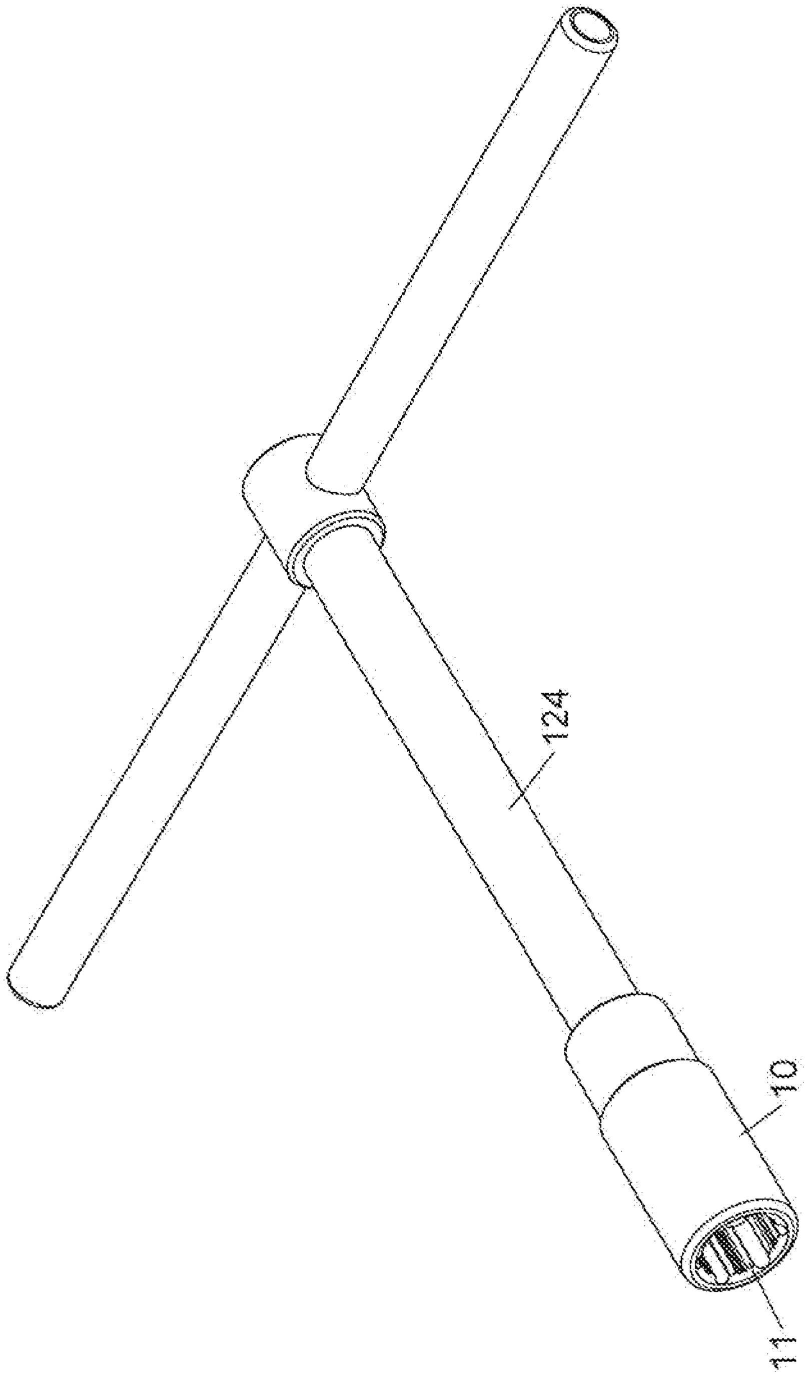
FIG. 10 is a perspective view of an engaging structure for a hand tool in accordance with the fifth preferred embodiment of the present invention.

Referring to FIG. 10, the main body 10 is a first sliding rod structure 124.

Figure 11:
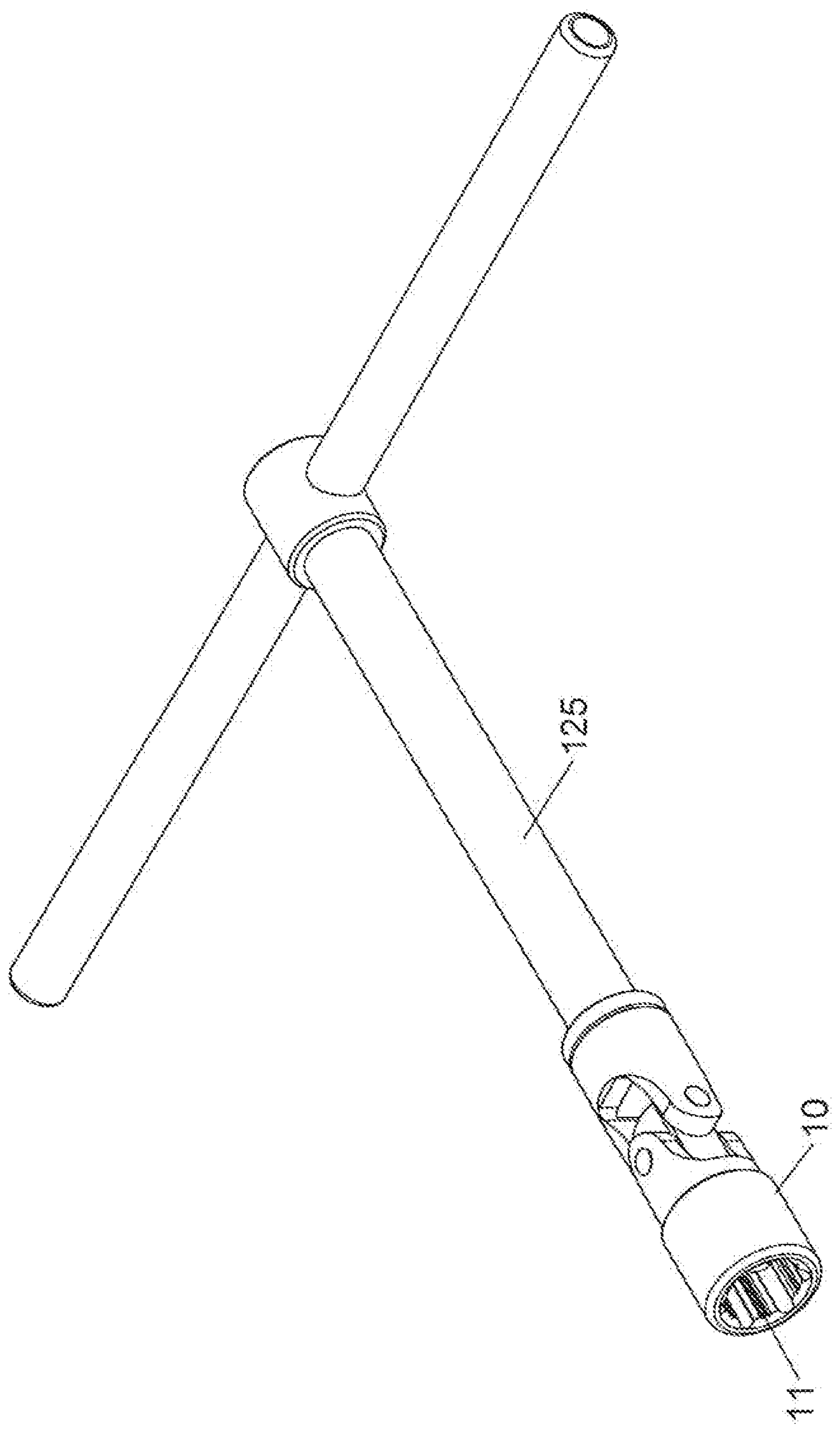
FIG. 11 is a perspective view of an engaging structure for a hand tool in accordance with the sixth preferred embodiment of the present invention.

Referring to FIG. 11, the main body 10 is a second sliding rod structure 125 with a universal connector.

Figure 12:
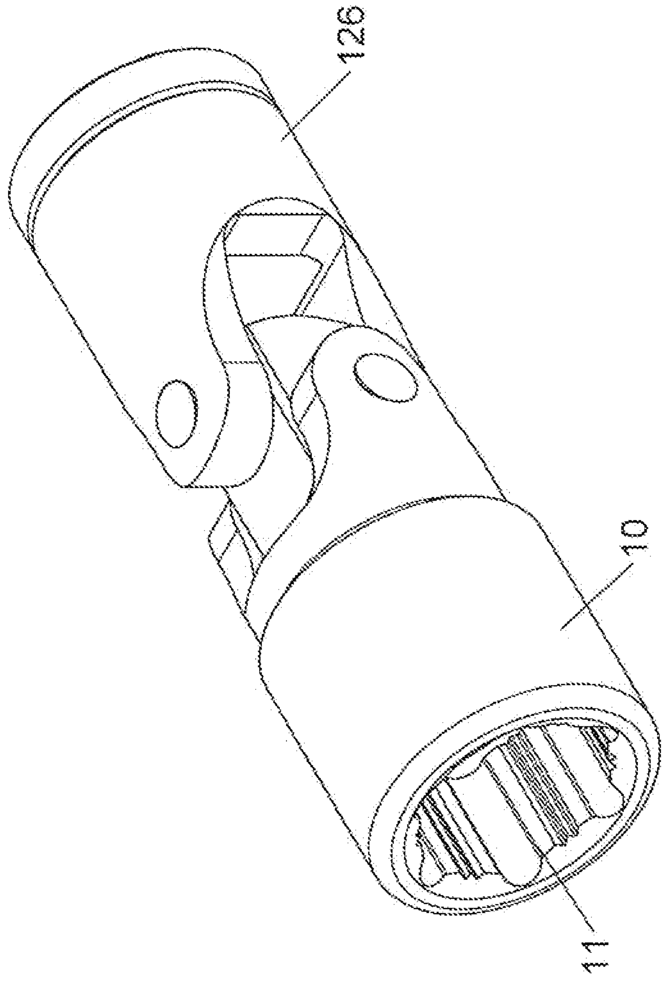
FIG. 12 is a perspective view of an engaging structure for a hand tool in accordance with the seventh preferred embodiment of the present invention.

Referring to FIG. 12, the main body 10 is a float connector or a universal connector 126.

Figure 13:
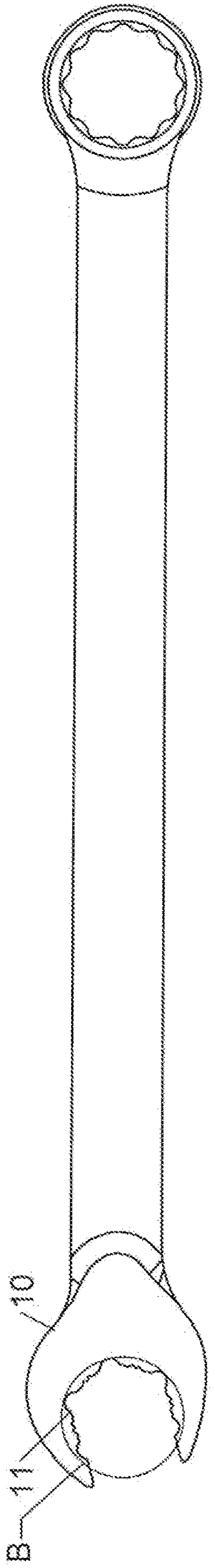
FIG. 13 is a top view of an engaging structure for a hand tool in accordance with the eighth preferred embodiment of the present invention.
Figure 14:
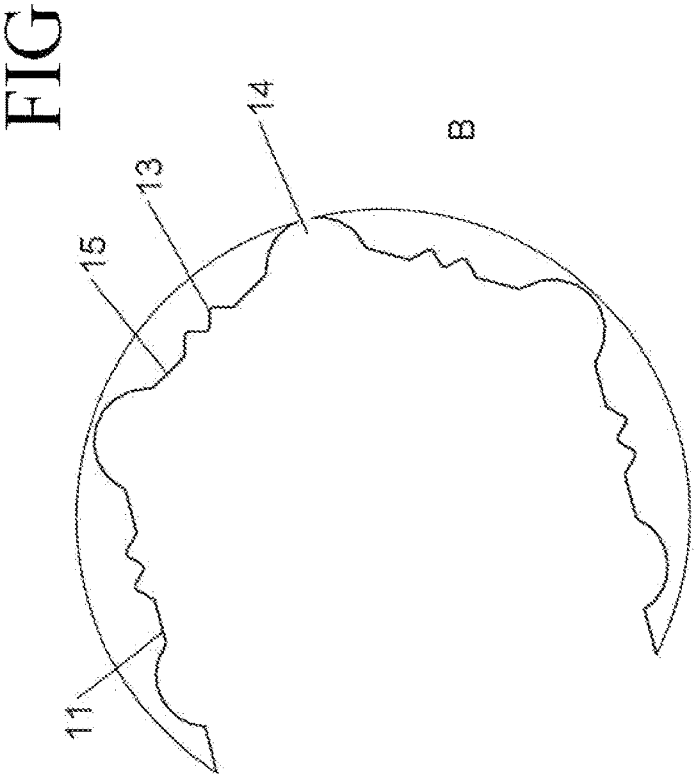
FIG. 14 is a locally enlarged view of the engaging structure for a hand tool taken along circle B as shown in FIG. 13.

Referring to FIGS. 13 and 14, the main body 10 is a combination wrench structure, and the mounting element 11 is an open end wrench structure.

Figure 15:
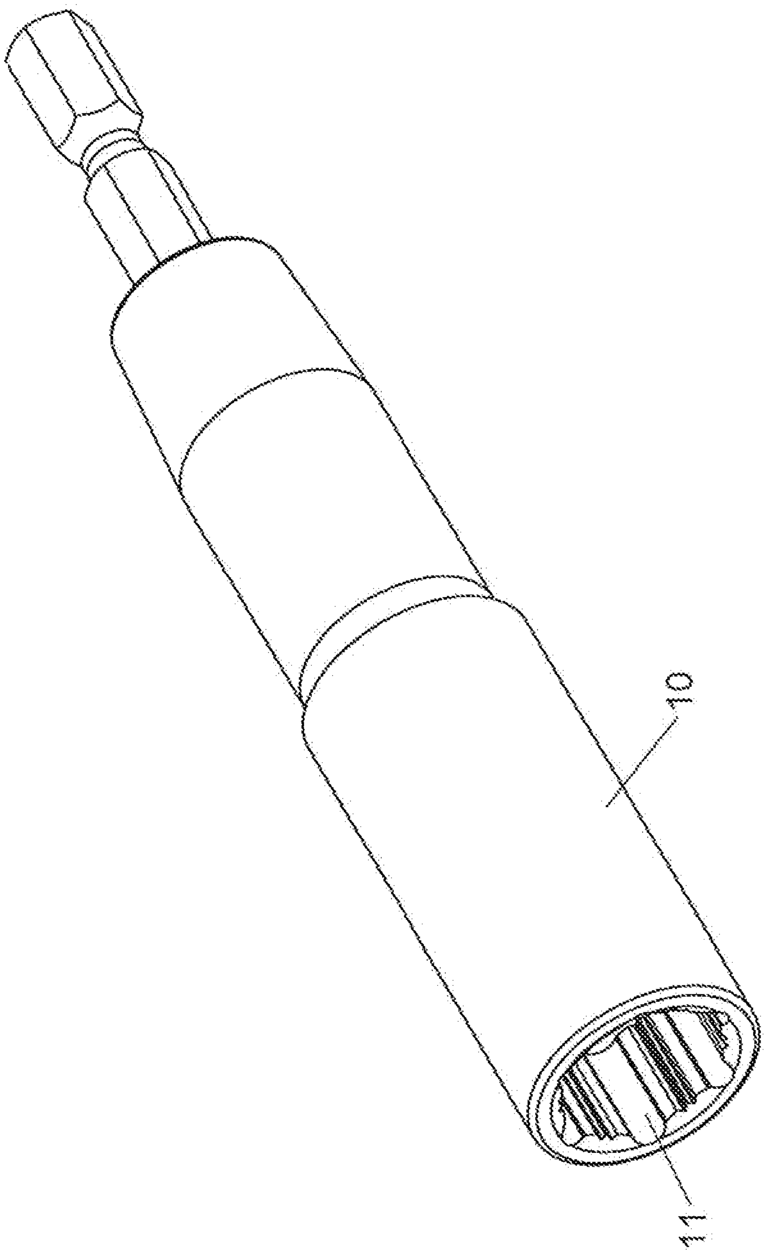
FIG. 15 is a top view of an engaging structure for a hand tool in accordance with the ninth preferred embodiment of the present invention.

Referring to FIG. 15, the main body 10 is mounted on a hexagonal rod which is distant from the mounting element 11.

Figure 16:
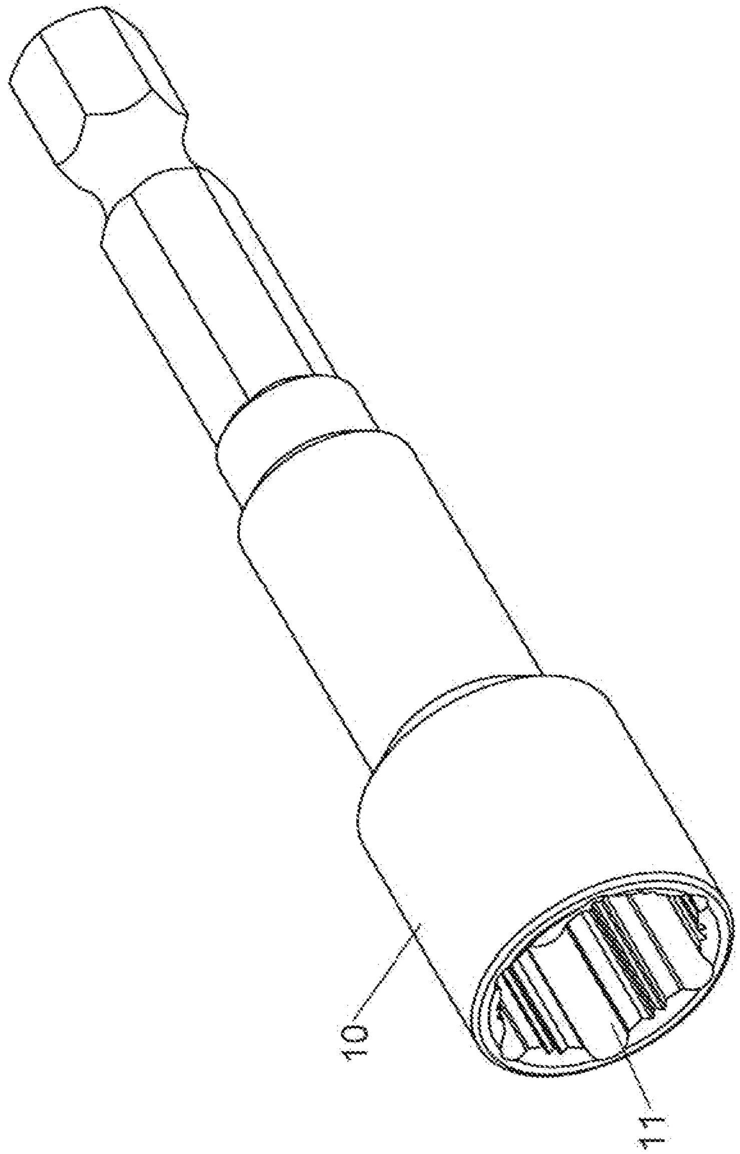
FIG. 16 is a top view of an engaging structure for a hand tool in accordance with the tenth preferred embodiment of the present invention.

Referring to FIG. 16, the main body 10 is integrally formed with a hexagonal rod which is distant from the mounting element 11.

Figure 17:
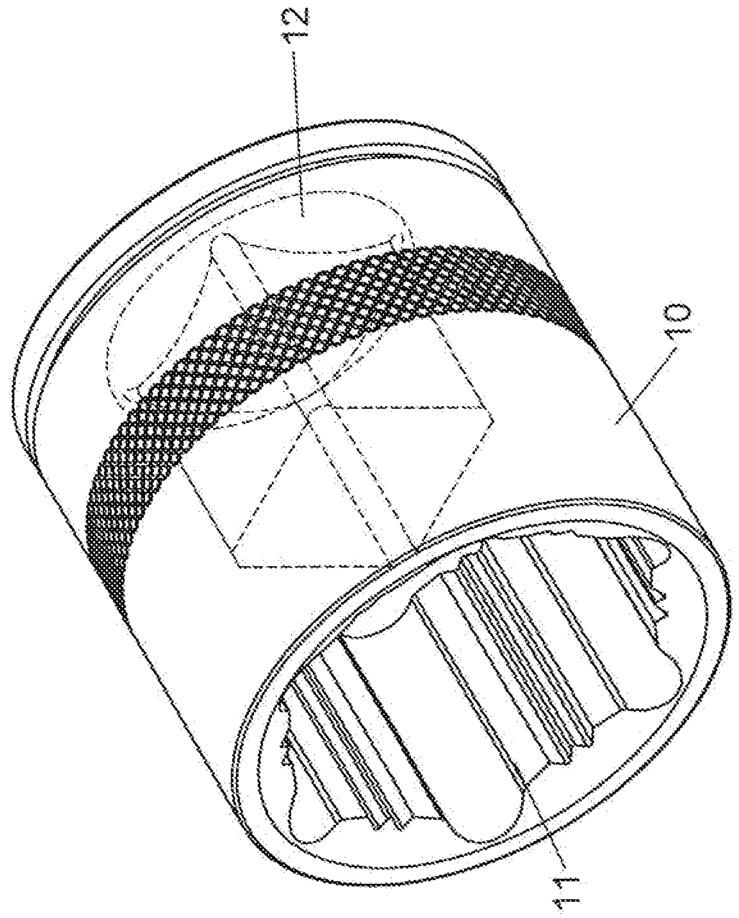
FIG. 17 is a top view of an engaging structure for a hand tool in accordance with the eleventh preferred embodiment of the present invention.

Referring to FIG. 17, the main body 10 is a socket structure. The main body 10 has a peripheral face annularly provided with an embossing portion. An annular groove is formed in the peripheral face of the main body 10 and is close to the driven element 12.

Figure 18:
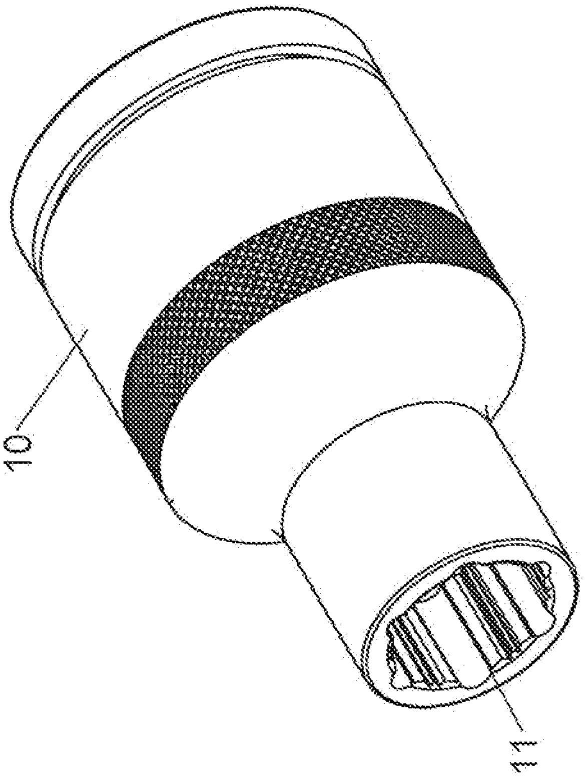
FIG. 18 is a top view of an engaging structure for a hand tool in accordance with the twelfth preferred embodiment of the present invention.

Referring to FIG. 18, the main body 10 is a socket structure. The main body 10 has a peripheral face annularly provided with an embossing portion. An annular groove is formed in the peripheral face of the main body 10 and is close to the driven element 12.

Accordingly, the engaging structure for a hand tool has the following advantages.

1. Referring to FIGS. 4-6, the mounting element 11 is provided with the second recessed portions 14, so that the mounting element 11 is used for mounting and receiving the first screw member 30, the second screw member 40, and the third screw member 50 with three different specifications, thereby enhancing the versatility of the main body 10.

2. The six first angled corners 32 of the first screw member 30 are respectively disposed in the second recessed portions 14 of the mounting element 11, the six second angled corners 42 of the second screw member 40 are respectively disposed in the second recessed portions 14 of the mounting element 11, and the six protruding ribs 51 of the third screw member 50 are respectively received in the second recessed portions 14 of the mounting element 11, so that the mounting element 11 is used for mounting the first screw member 30, the second screw member 40, and the third screw member 50.

3. Each of the second recessed portions 14 is provided with the first curved face 141 and the second angle 18, so that the second recessed portions 14 are allowed to receive the six protruding ribs 51. Thus, the main body 10 can be used to rotate the third screw member 50.

4. Referring to FIG. 4, when the first screw member 30 is mounted in the mounting element 11, the six first angled corners 32 of the first screw member 30 are respectively disposed in the second recessed portions 14 of the mounting element 11, so that the second recessed portions 14 of the mounting element 11 will not touch or rub the six first angled corners 32 of the first screw member 30 during rotation of the main body 10, to prevent the six first angled corners 32 of the first screw member 30 from being worn out.

5. The mounting element 11 is provided with the locking sides 15 so that the main body 10 has a structure similar to that of a conventional engaging structure with a hexagonal recess.

6. Each of the six angled corners 28 is served as a center of circle of the first curved face 141 of one of the second recessed portions 14, so that the six protruding ribs 51 of the third screw member 50 are respectively received in the second recessed portions 14 of the mounting element 11. Thus, the mounting element 11 can be used to mount the third screw member 50.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. An engaging structure for a hand tool, comprising:

a main body;

wherein:

the main body has a first end provided with a mounting element;

the mounting element is a hexagonal recess;

the mounting element includes multiple first recessed portions, multiple second recessed portions, and multiple locking sides;

the first recessed portions, the second recessed portions, and the locking sides are arranged alternately and annularly;

the mounting element includes six first recessed portions, six second recessed portions, and six locking sides;

each of the first recessed portions is provided with two grooves;

each of the two grooves has a triangular shape or an equilateral triangular shape;

the two grooves are arranged in a linear shape and are connected without a distance therebetween;

a first guide corner is defined between the two grooves;

the first guide corner has a round shape;

a first angle is defined between two sides of each of the two grooves;

the first angle is equal or close to sixty degrees or equal or close to ninety degrees;

each of the two grooves has a bottom provided with a second guide corner;

each of the first recessed portions has two second guide corners, and the first guide corner is arranged between the two second guide corners;

the second guide corner has a round shape;

the second guide corner has a dimension equal or close to that of the first guide corner;

each of the first recessed portions has two ends each provided with a third guide corner;

the third guide corner has a round shape;

the third guide corner has a dimension equal or close to that of the first guide corner;

at least one of the first recessed portions is arranged between two of the second recessed portions;

each of the second recessed portions is provided with a first curved face;

the first curved face has an arcuate shape;

the first curved face has a single radius;

each of the locking sides has a planar shape;

each of the locking sides is arranged between two of the second recessed portions;

each of the first recessed portions is formed on one of the locking sides;

each of the locking sides includes one of the first recessed portions;

two of the second recessed portions are arranged on two ends of each of the locking sides;

each of the locking sides is arranged between the first curved face of one of the second recessed portions and the first curved face of another one of the second recessed portions;

each of the locking sides is not tangent to the first curved face of each of the second recessed portions;

a round guide corner is defined between each of the locking sides and the first curved face of each of the second recessed portions to smoothly connect each of the locking sides with the first curved face of each of the second recessed portions;

each of the locking sides has a length defining a first length;

a second length is defined by each of the first recessed portions together with two third guide corners at the two ends thereof;

the second length is less than or close to one half of the first length;

a height is defined by a maximum height between each of the two grooves and one of the locking sides;

the height is defined between the second guide corner of each of the two grooves and one of the locking sides;

the first curved face has two ends forming an expanding angle relative to an axis of the main body and defining a second angle;

the second angle is less than or close to thirty degrees;

the locking sides construct a first hexagon;

the first hexagon has a center provided with a central axis;

the first hexagon has six side faces;

each of the six side faces coincide with each of the locking sides;

each of the six side faces has a length defining a third length;

the first length is 0.5 times to 0.6 times of the third length;

the central axis is provided with a vertical line;

the vertical line passes through a center of circle of the first guide corner;

a fourth length is defined between two of the six side faces;

the height is 0.03 times to 0.35 times of the fourth length;

the first hexagon has an inscribed circle;

the central axis is served as an axis of the inscribed circle;

the inscribed circle is tangent to each of the six side faces;

the inscribed circle has a diameter equal to the fourth length;

the central axis is served as an axis of a second hexagon;

the second hexagon is smaller than the first hexagon;

the second hexagon has six side lines parallel with the six side faces respectively;

the second hexagon has six angled corners;

each of the six angled corners is served as a center of circle of the first curved face of one of the second recessed portions; and each of the six angled corners is close to or coincides with the inscribed circle.

2. The engaging structure as claimed in claim 1, wherein:

the main body is a socket;

the main body has a second end provided with a driven element;

the driven element is a tetragonal recess; and the driven element is mounted on another hand tool.

3. The engaging structure as claimed in claim 1, wherein:

the main body is used to operate a third screw member;

the third screw member has a star-shaped structure;

the third screw member is provided with six protruding ribs;

the six protruding ribs of the third screw member are arranged annularly;

the six protruding ribs of the third screw member are received in the second recessed portions of the mounting element respectively; and each of the six protruding ribs of the third screw member rests on the first curved face of one of the second recessed portions.

4. The engaging structure as claimed in claim 1, wherein:

the main body is a penetrating socket structure;

the main body is a box end wrench structure; and the main body is a ratchet wheel structure.

5. The engaging structure as claimed in claim 1, wherein:

the main body is a first sliding rod structure;

the main body is a second sliding rod structure with a universal connector;

the main body is a float connector or a universal connector;

the main body is mounted on a hexagonal rod which is distant from the mounting element; and the main body is integrally formed with a hexagonal rod which is distant from the mounting element.

6. The engaging structure as claimed in claim 1, wherein the main body is a combination wrench structure, and the mounting element is an open end wrench structure.

7. The engaging structure as claimed in claim 1, wherein:

the main body is a socket structure; and the main body has a peripheral face annularly provided with an embossing portion.

* * * * *